United States Patent

[11] 3,611,051

| [72] | Inventors | Henry F. Puppolo<br>N. Adams;<br>Mark Markarian, Williamstown, boh of Mass. |
|---|---|---|
| [21] | Appl. No. | 19,192 |
| [22] | Filed | Mar. 13, 1970 |
| [45] | Patented | Oct. 5, 1971 |
| [73] | Assignee | Sprague Electric<br>North Adams, Mass. |

[54] FEED-THROUGH, ELECTROLYTIC, BOOK CAPACITOR
6 Claims, 7 Drawing Figs.

| [52] | U.S. Cl. | 317/230, 317/261 |
|---|---|---|
| [51] | Int. Cl. | H01g 9/14 |
| [50] | Field of Search | 317/230, 231, 233, 260, 261 |

[56] References Cited
UNITED STATES PATENTS

| 2,537,959 | 1/1951 | Beverly | 317/260 |
|---|---|---|---|
| 2,878,433 | 3/1959 | Beresford | 317/261 |
| 3,024,394 | 3/1962 | Salisbury | 317/261 |
| 3,439,230 | 4/1969 | Lambert et al. | 317/231 |
| 3,518,500 | 6/1970 | Jimerson et al. | 317/230 |

Primary Examiner—James D. Kallam
Attorneys—Connolly and Hutz, Vincent H. Sweeney, James Paul O'Sullivan and David R. Thornton ABSTRACT: An electrolytic, book capacitor having two pairs of feed-through terminals extending from a stripline which consists of two thick conductive plates separated by an insulative layer, each plate of the stripline being overlaid with alternately stacked anode and cathode foils separated from each other by paper spacers with each stack of anode and cathode foils connected both electrically and physically to its respective stripline plate.

3,611,051

FEED-THROUGH, ELECTROLYTIC, BOOK CAPACITOR

BACKGROUND OF THE INVENTION

This invention relates to a feed-through, electrolytic, book capacitor and more particularly to a four terminal feed-through capacitor having a stacked structure of anode foils, cathode foils, and paper spacers which sandwich a center stripline comprising two conductive plates separated by an insulator.

Present computer applications have necessitated the development of high capacitance, low-voltage electrolytic capacitors that filter at low frequencies and allow high-speed switching at high frequencies. Electrolytic capacitors capable of operating at high frequencies demand lower effective series resistances, ESR and lower effective series inductances, ESL so as to decrease the power dissipated within the capacitor thereby reducing the damaging effects of overheating. In standard two-terminal electrolytic capacitors, the ESR of the capacitor comprises various contributing resistances such as the series plate resistance, parallel dielectric resistance, and series conductor and connection resistances between the plates, the terminals, and other parts of the circuit in which the capacitor is used. Similarly, the ESL of the capacitor is made up of various contributing inductances such as series plate inductances, and series conductor inductances between the plate, the terminals, and other parts of the circuit in which the capacitor is used. Prior art methods for reducing the ESR and ESL of standard two-terminal electrolytic capacitors have been to use short and heavy conductors. The so-called four-terminal stacked capacitor was also introduced which had the advantage of substantially lower ESR and ESL than could be achieved with standard two-terminal capacitors. Improved four-terminal capacitors having heavy feed-through terminal bars located midway in the stack have improved the high-frequency operating characteristics of the capacitor, however new methods of further reducing the ESR and ESL are constantly being sought.

Therefore it is an object of this invention to produce a new and distinct capacitor having ESR's and ESL's substantially lower at high frequency than previously achievable with conventional four-terminal stacked capacitor designs employing heavy feed-through terminal bars.

It is a further object of this invention to produce a capacitor having a new and improved method for terminating the internal elements of the capacitor and using the same terminating method to contact outside terminals without altering the low-loss and high-frequency qualities of the capacitor.

SUMMARY OF THE INVENTION

An electrolytic, book capacitor with two pairs of feed-through terminals is produced in accordance with this invention by stacking anode electrode foils, cathode electrode foils and paper spacers on both sides of a center stripline which consists of two conductive plates separated by an insulator. The center stripline comprises two flat conducting plates of substantially greater thickness than the anode and cathode electrode foils which make up the capacitor, and would preferably be of a regular geometric shape such as a rectangle. Two opposing ends of each stripline plate extend outside the capacitor to provide two pairs of feed-through terminals for electrical access to the capacitor. The anode and cathode electrode foils which are preferably made of aluminum foil are alternately stacked on both sides of the stripline with paper spacers interposed between all the foils. The anode foils are formed to a predetermined voltage before stacking. The anode and cathode foils are cut to substantially the same shape as the stripline plates except that the foils do not have the extending terminals of the stripline plates.

Tabs extend from the sides of the stripline plates and from the sides of the electrode foils so that when the foils are stacked, all the tabs extending from the anode foils are aligned on top of each other and are further aligned to overlay the tabs extending from the top stripline plate while all the tabs extending from the cathode foils also are aligned to overlay the tabs extending from the bottom stripline plate. Next all the anode electrode foils are connected together by simultaneously welding together all their respective tabs along with the corresponding tabs of the top stripline plate. The cathode electrode foils are similarly connected by simultaneously welding together all their respective tabs along with the corresponding tabs of the bottom stripline plate. Therefore the terminals extending from the top stripline plate become the anode terminals while the terminals extending from the bottom stripline plate become the cathode terminals. The stacked capacitor structure is then impregnated with an electrolyte and packaged in an appropriate container such as a plastic box with the feed-through terminals extending through two opposing sides of the container. Other means of containing the stacked structure may be employed such as a tubular metal container having molded plastic covers sealing each end while the feed-through terminals extend through the molded covers.

DESCRIPTION OF THE PREFERRED EMBODIMENT

Figure 1:
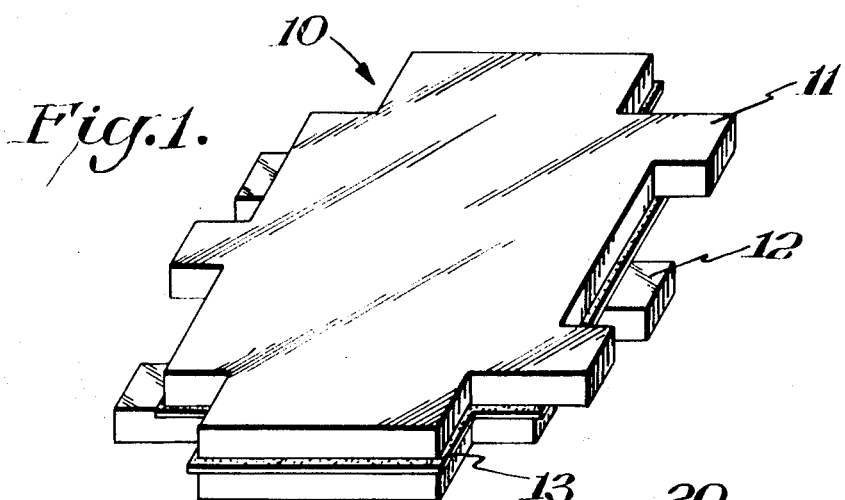
FIG. 1 is an enlarged perspective view of the preferred stripline structure.
Figure 2:
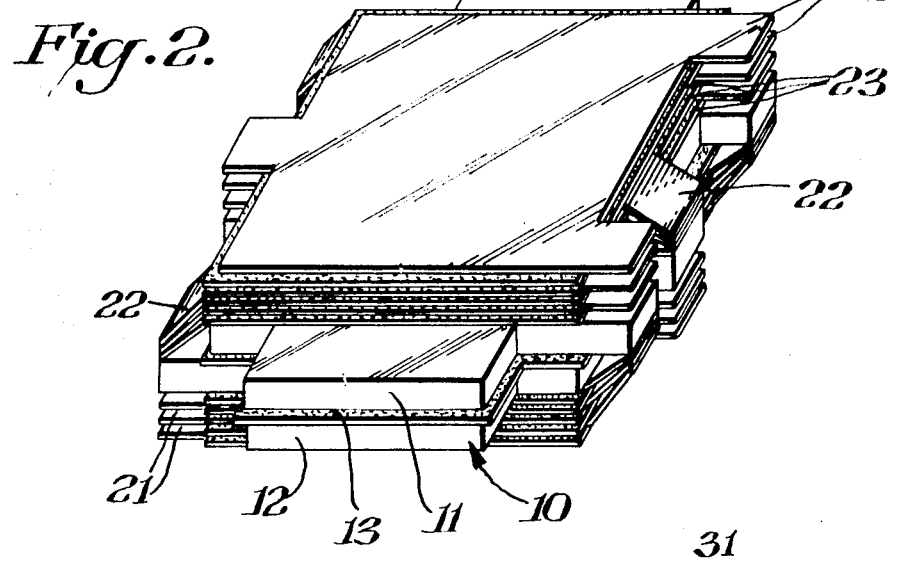
FIG. 2 is a perspective view of the stacked capacitor structure showing the anode and cathode electrode foils stacked on both sides of the stripline of FIG. 1.

The feed-through electrolytic book capacitor of this invention is produced by welding a stacked structure of anode foils, cathode foils and paper spacers to the basic stripline 10 shown illustrated in FIG. 1 which forms the core of the capacitor. The particular geometric configuration of the stripline shown in FIG. 1 is adapted for a four-terminal capacitor in order to achieve a lower ESR and ESL, thereby increasing the high current-carrying capability of the capacitor. FIG. 2 shows the basic capacitor structure 20 which comprises stacked anode foil electrodes 21, stacked cathode foil electrodes 22, and stacked paper spacers 23, all sandwiching the stripline 10.

The stripline structure shown illustrated in FIG. 1 comprises an anodized aluminum anode plate 11 and an anodized aluminum cathode plate 12 which are separated by insulating sheet 13. Alternatively the anode and cathode plates could be made of other anodizable metals such as tantalum or niobium. Both the anode plate 11 and the cathode plate 12 are of the same size and shape and when arranged in the stripline 10, one aluminum plate is flipped over so as to form the symmetrical structure illustrated in FIG. 1. The thickness of the anode and cathode plates and the insulating sheet have all been exaggerated in the drawing in order to better illustrate the structure of the stripline. The anode and cathode plates, 11 and 12 of the preferred embodiment would normally be 64 mils thick, but could be thinner or thicker depending on the particular requirements of the capacitor. Insulating sheet 13 would be mylar in the range of 1 to 10 mils thick although other insulating materials such as epoxy, glass, or Teflon may be used for the insulating sheet 13. The narrow tabs extending from the sides of anode plate 11 and cathode plate 12 are provided in order to facilitate the welding of stacked anode and cathode foils. The wide extending tabs at each end of anode plate 11 and cathode plate 12 would extend outside the packaging of the capacitor and provide terminals for outside access to the capacitor. Although this particular geometrical configuration for the stripline seems to be advantageous, the scope of the invention is by no means limited to this particular size and shape stripline and there may be a multitude of different shaped striplines some of which will be subsequently illustrated.

FIG. 2 shows a capacitor structure embodying the stripline 10. The anode foil electrodes 21 and the cathode foil electrodes 22 are alternately stacked on each side of stripline 10 with paper spacers 23 interspaced between the anode and cathode foils. The stacked configuration is preferred over the rolled type because of the lower values of ESR and ESL achievable with the stacked structure. The anode and cathode foils of the capacitor shown in FIG. 2 are of high-purity aluminum (99 percent or higher) which tends to eliminate problems of corrosion and insures the formation of high-quality aluminum oxide films. In the alternative anode and cathode foils could also be made of any other film-forming metal such as tantalum or niobium. The anode foils 21 are formed to the desired voltages by the same techniques that are well known to the capacitor art for forming foils used in rolled capacitors. The cathode foils may also be formed in order to achieve a nonpolar capacitor. The spacer paper 23 may be 0.0005 to 0.004 inch thick, Kraft, or Benares type which is ordinarily used for electrolytic capacitors.

The capacitor structure is made by alternately stacking cathode and anode foils on each side of stripline 10. The anode and cathode foils are cut to the same size and shape which in this particular embodiment would be essentially the same as the size and shape of the anode and cathode plates of stripline 10 except that the foils do not have the wide extending tabs of the plates. The anode and cathode foils are arranged in the stack so that all the narrow tabs extending from the anode foils emerge from the stack in the same columns and all the narrow tabs extending from the cathode foils emerge from the stack in the same columns. This is accomplished by flipping over the cathode foils when they are stacked on top of the anode foils so that the cathode foils form a mirror image of the anode foils. The anode and cathode electrode foils are in the order of 2 to 3 mils thick which is substantially thinner than the 64-mil-thick stripline plates. The anode electrode foils 21 are attached to each other and to stripline anode plate 11 both electrically and physically, by simultaneously (TIG) Tungsten Inert Gas welding together all the narrow extending tabs of the anode electrode foils 21 along with the corresponding narrow extending tabs of anode plate 11. The cathode foils 22 are also electrically and physically attached to each other and to the stripline cathode plate 12 by simultaneously (TIG) welding together the corresponding extended tabs as shown in FIG. 2. The electrode tabs may also be welded by any other technique known to the art for welding film-forming metals such as MIG welding. After the electrode foils are welded to the stripline, the capacitor structure is impregnated with a standard electrolyte such as one of the glycol borate types and then encased in the following manner.

Figure 3:
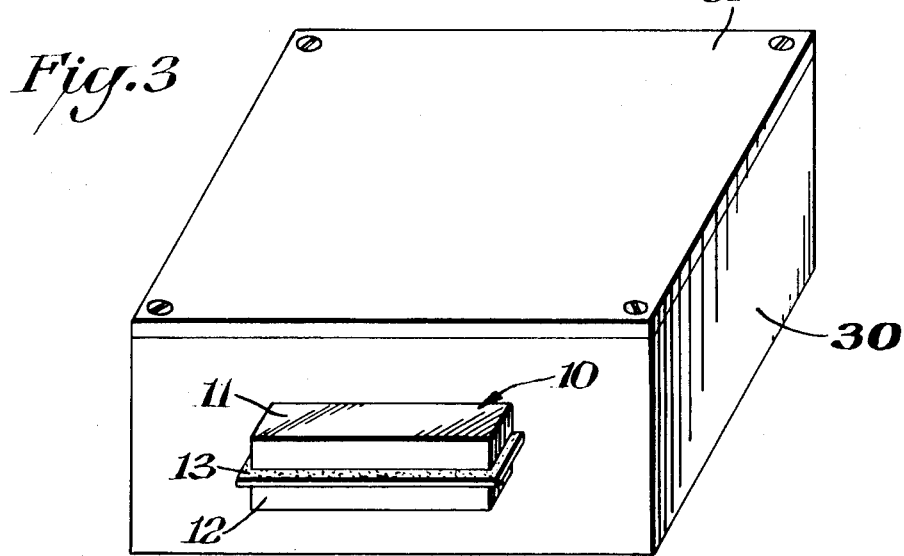
FIG. 3 is a perspective view showing the container for the capacitor structure of FIG. 2 with the extending terminals for outside electrical access to the capacitor.

FIG. 3 shows the capacitor structure of FIG. 2 sealed in a box 30 with the wide tabs of stripline 10 extending through the sides of box 30 to provide terminals for outside access to the capacitor. The extending wide tabs of stripline plate 11 are the anode terminals which extend from both sides of the capacitor case 30 and provide a feed-through type of structure. The extending wide tabs of stripline plate 12 are the cathode terminals which also extend from both sides of the capacitor case 30 and are separated from the anode terminals by insulating spacer 13. Having anode and cathode terminals extending from both sides of the capacitor case provides two pair of feed-through terminals for the capacitor. Capacitor case 30 in the preferred embodiment is a plastic box into which the capacitor structure of FIG. 2 is inserted with cover 31 applied and bolted. A potting wax is subsequently poured in from an opening that is subsequently sealed with epoxy resin following aging. A small rubber venting means would be preferably provided in the casing 30.

Tests have shown that ESR's for the stacked design can be achieved which are in the order of one-sixth the ESR's achievable with the best wound design with multiple tabbing. The electrode foil- and plate-connecting techniques previously described for the stripline-type capacitor drastically reduce the foil and terminal resistances thereby contributing to the low-series impedance properties of the capacitor, making the capacitor suitable for low-impedance filtering and high-frequency switching applications as required in computers. Tests have shown the connecting techniques of the stripline-type capacitor have so reduced foil and terminal resistances that ESR's of less than 1 milliohm are achievable at frequencies of 10 kHz. Also the thick conducting plates of the stripline which form the entire center section of the capacitor provide an excellent heat sink for the transfer of heat from the center of the capacitor thereby reducing the possibility of overheating and the accompanying adverse affects upon the capacitor. The heating of the electrolytic capacitor is caused by a small AC ripple voltage that is superimposed on the direct voltage. Tests were conducted on the electrolytic stripline-type capacitor of this invention wherein the change in case and terminal temperatures with application of increasing ripple current was measured. The tests showed that it required 65 amperes of ripple current to cause a temperature rise of 10° C. in the electrolytic stripline-type capacitor as compared to a current of 10.5 amperes to cause the same increase in temperature for a wound design with multiple tabbing. The increased current capability is attributed to the lower ESR of the stripline capacitor together with the improved heat-sinking characteristics of the stripline.

The inherent inductance of the stripline-type electrolytic capacitor is also substantially lower than can be achieved with a wound design with multiple tabbing. One of the most important advantages of the stripline-type capacitor is that two- and four-terminal impedances and inductances for the stacked foil capacitor are substantially the same irrespective of input and output direction due to the symmetrical geometry of its construction. Two- and four-terminal ESR's of less than 1 milliohm have been obtained and ESL's of less than 1 nh. for two- and four-terminal measurements have also been achieved.

Figure 4:
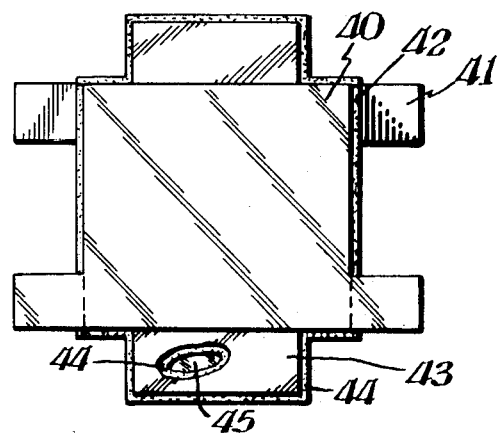
FIG. 4 is a top view showing a first alternate geometric configuration for the stacked capacitor structure of FIG. 2.

FIG. 4 shows an alternate embodiment for the basic stripline-type capacitor structure of FIG. 2. Anode electrode foils 40 and cathode electrode foils 41 are alternately stacked with interleaving paper spacers 42 in the same manner as previously described. The electrode foils are cut in the shape of a T and arranged in the stack so that the T-wings of the anode foils stack up on one side of the capacitor and the T-wings of the cathode foils stack up on the opposite side of the capacitor. The stripline structure for this particular embodiment comprises an aluminum anode plate 43 and an aluminum cathode plate 45 separated from each other by insulating sheet 44. The anode and cathode stripline plates are also formed in the shape of a T except for the wide extending tabs at each end that provide terminals for outside access to the capacitor. The wings of the T electrode foils are (TIG) welded to each other and (TIG) welded to the wings of the stripline T. The capacitor would be encased in a plastic box in the same manner as previously described.

Figure 5:
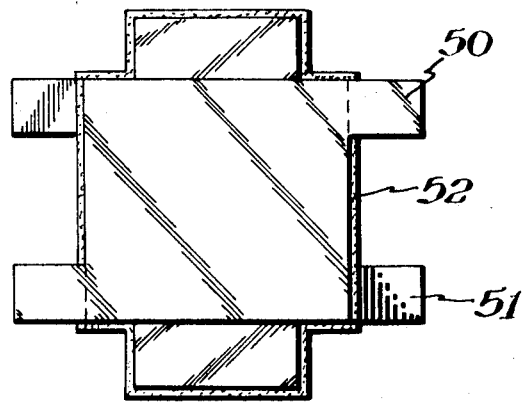
FIG. 5 is a top view showing a second alternate geometric configuration for the stacked capacitor structure of FIG. 2.
Figure 6:
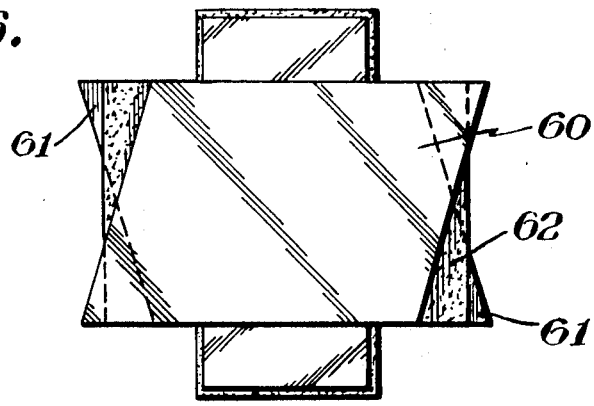
FIG. 6 is a top view showing a third alternate geometric configuration for the stacked capacitor structure of FIG. 2.

FIG. 5 shows a third embodiment for the stripline capacitor structure of FIG. 2. Here the electrode foils are cut so as to have narrow extending tabs on two diagonally opposed corners of the electrode foil. Aluminum electrode foils 50 are the anodes which are alternately spaced with aluminum, cathode, foil electrodes 51 separated from each other by paper spacers 52. The stripline structure again comprises two aluminum plates cut to the shape of the electrode foils except for the two wide extending tabs that provide terminals for outside access to the capacitor. The foils and stripline are welded and encased in the manner previously described. FIG. 6 shows a fourth embodiment for the stripline capacitor of FIG. 2 which is actually very similar to the capacitor structure shown in FIG. 5 except instead of having actual rectangular tabs extending from the corners of the electrode foils, the electrode foils are cut in the shape of rhomboids and the pointed corners extend so as to form common areas of connection for the anode foils 60 and the cathode foils 61 respectively. Paper sheets 62 keep the electrode foils spaced apart. Many other different shaped electrode foils would be suited for use with the stripline structure. The number of narrow tabs extending from the sides of the electrode foils and from the stripline plates could be increased from the number shown in FIG. 2 as long as the basic symmetrical stripline is maintained.

Figure 7:
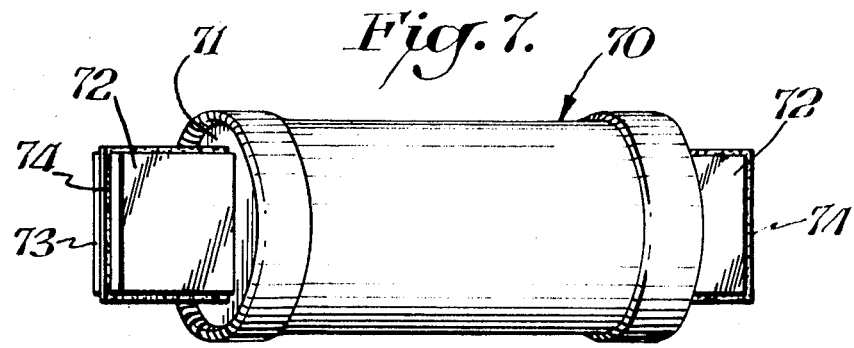
FIG. 7 is a perspective view showing an alternate type of container for the capacitor structures of FIGS. 2 through 6.

Alternate types of packaging for the stacked stripling capacitor can also be used. FIG. 7 shows any one of the stacked capacitor structures illustrated in FIGS. 2 through 6 packed in a tubular can 70 which is sealed at each end with molded plastic covers 71 in order to achieve the same resistance to environmental and performance tests presently available in rolled-type capacitors. Anode terminals 72 and cathode terminals 73 extend from each end of the capacitor and are separated from each other by insulating sheet 74. The anode and cathode terminals are the wide extending tabs of the basic stripline structure shown in FIGS. 1 through 6. The electrical continuity between both anode and cathode terminals provided by the stripline structure establishes a four-terminal structure of the feed-through type. The cans 70 and covers 71 would preferably be either oval or rectangular in order to better fit the geometry of the stacked capacitors. The covers 71 are of molded plastic and they could be molded around the aluminum stripline terminals prior to stacking and welding of the foils and stripline. The aluminum used for the manufacture of the stripline may be anodized for better bonding of the molding compound which may be either thermoset or thermoplastic as required to meet resistance to electrolytes. The stacked capacitor is impregnated with a suitable electrolyte and an elastomer gasket is fitted around the outer rim of plastic cover 71 in order to form an intimate seal between the cover and can. The ends of the tubular can 70 are of the well-known "high hat" construction and the edges of the can are rolled over to form an effective seal with plastic cover 71, by techniques well known to the capacitor art.

It may also be desirable to modify the four-terminal feed-through configuration shown in FIG. 7 to a two-terminal type of capacitor wherein the stacked stripline capacitor is packaged in a cylindrical-type can similar to the one shown in FIG. 7 but open only at one end. This would involve omitting one set of anode and cathode terminal tabs from the basic stripline structure. Although the capacitor now becomes a two-terminal device, the electrical parameters of ESR and ESL are substantially the same for the two-terminal device as for the four-terminal device for this particular type of stacked stripline capacitor as previously discussed. The open end of the capacitor can be sealed with a plastic cover in the same manner as the ends of the capacitor of FIG. 7 are sealed.

What is claimed is:

1. A flat stacked capacitor comprising a first substantially flat conducting plate part of which extends outside the stacked capacitor so as to provide at least one terminal for outside electrical contact to said capacitor; a second substantially flat conducting plate of approximately the same size as said first plate and positioned opposite said first plate with a portion of said second plate extending outside the stacked capacitor so as to provide at least one terminal for outside electrical contact to said capacitor; an insulating layer sandwiched between said first and second conducting plates, to electrically isolate said plates from each other; a plurality of anode electrodes stacked on the open surfaces of said first and said second conducting plates and having portions thereof in physical and electrical contact with each other and with said first conducting plate; a plurality of stacked cathode electrodes spaced between said stacked anode electrodes and having portions thereof in physical and electrical contact with each other and with said second conductive plate and paper spacers arranged between all said stacked electrodes separating said electrodes so as to prevent electrical shorting between said electrodes.

2. The stacked capacitor of claim 1 wherein said first conductive plate has a central, rectangular portion with a first pair of flat terminals extending from opposite edges of said central portion to provide access for outside electrical contact to said capacitor and a minimum of one tab extending from each of the other two edges of said central portion; said second conductive plate has a rectangular shaped central portion substantially identical to the central portion of said first plate and is aligned directly opposite said first plate with a second pair of flat terminals extending from opposite edges of said central portion so as to overlie said insulating layer directly opposite said first terminals and a minimum of one tab extending from each of the other two edges of said central portion so as not to be directly opposite the tabs extending from said first plate; said anode electrodes have rectangular shaped central portions substantially identical to the central portions of said first and second conductive plates, with tabs extending from two opposite edges of said central portion, said tabs overlying the extended tabs of said first plate and connected to be in electrical contact with the tabs of said first plate; and said cathode electrodes have rectangular shaped central portions substantially identical to the central portions of said first and second conductive plates with tabs extending from two opposite edges of said central portion, said tabs overlying the extended tabs of said second plate and connected to be in electrical contact with the tabs of said second plate.

3. The stacked capacitor of claim 2 wherein said first and second conductive plates are a film-forming metal; said electrodes are a film-forming metal foil; said anode foil is formed to a predetermined voltage and said paper spacers are impregnated with an electrolyte.

4. The stacked capacitor of claim 1 wherein said first conductive plate has a central portion in the shape of a rhomboid with a first pair of flat terminals extending from opposite edges of said central portion to provide access for outside electrical contact to said capacitor; said second conductive plate has a central portion substantially identical to the central portion of said first plate with a second pair of flat terminals extending from opposite edges of said central portion and positioned over said insulating layer so that all the edges of said central portions from which all the terminals extend are aligned directly opposite each other while the other edges of said central portions cross over each other; said anode electrodes are of substantially the same shape as the central portions of said first and second conductive plates, said anode electrodes being positioned so that their edges are in line with the respective edges of the central portion of said first conducting plate with the diagonally opposed sharp corners of the rhomboid shaped electrodes in electrical contact with the two diagonally opposed sharp corners of the central portion of said first conducting plate; and said cathode electrodes are of substantially the same shape as the central portion of said first and second conductive plates; said cathode electrodes being positioned so that their edges are in line with the respective edges of the central portion of said second conducting plate with the diagonally opposed sharp corners of the rhomboid shaped electrodes in electrical contact with the two diagonally opposed sharp corners of the central portion of said second conducting plate.

5. The stacked capacitor of claim 4 wherein said first and second conductive plates are a film-forming metal; said electrodes are a film-forming metal foil; said anode foil is formed to a predetermined voltage; and said paper spacers are impregnated with an electrolyte.

6. The capacitor of claim 1 including a metal case having at least one open end, said case containing said stacked capacitor with said terminal extending through the open end of said case; a plastic seal molded around said extended terminal and positioned at the open end of said case and sealing means to effectively bind the outer rim of said seal to the inner edge of said case near the open end of said case.